(12) United States Patent
Ronen

(10) Patent No.: US 11,852,763 B2
(45) Date of Patent: Dec. 26, 2023

(54) METHOD AND DEVICE FOR REDUCING BUCKING OF PNEUMATIC SEISMIC SOURCES

(71) Applicant: SERCEL, INC., Houston, TX (US)

(72) Inventor: Joshua M. Ronen, Orinda, CA (US)

(73) Assignee: SERCEL INC., Houston, TX (US)

( * ) Notice: Subject to any disclaimer, the term of this patent is extended or adjusted under 35 U.S.C. 154(b) by 128 days.

(21) Appl. No.: 17/476,850

(22) Filed: Sep. 16, 2021

(65) Prior Publication Data

US 2022/0163688 A1    May 26, 2022

Related U.S. Application Data

(60) Provisional application No. 63/116,739, filed on Nov. 20, 2020.

(51) Int. Cl.
| | | |
|---|---|---|
| *G01V 1/137* | (2006.01) | |
| *G01V 1/38* | (2006.01) | |
| *G01V 1/387* | (2006.01) | |

(52) U.S. Cl.
CPC ............. *G01V 1/137* (2013.01); *G01V 1/387* (2013.01); *G01V 1/3843* (2013.01)

(58) Field of Classification Search
CPC ............................ G01V 1/137; G01V 1/387
USPC .............................................. 367/17; 114/152
See application file for complete search history.

(56) References Cited

U.S. PATENT DOCUMENTS

| | | | | |
|---|---|---|---|---|
| 3,437,170 A | * | 4/1969 | Brock ....................... | G01V 1/13 181/120 |
| 3,493,072 A | * | 2/1970 | Johnston ................ | G01V 1/137 181/120 |
| 3,739,869 A | * | 6/1973 | Mayne .................... | G01V 1/387 181/120 |
| 3,923,122 A | * | 12/1975 | Itria ........................ | G01V 1/387 181/235 |
| 4,956,822 A | * | 9/1990 | Barber .................... | G01V 1/006 181/118 |
| 6,185,156 B1 | * | 2/2001 | Bouyoucos ............ | G01V 1/137 367/1 |
| 9,507,038 B2 | | 11/2016 | Richelmi et al. | |
| 2005/0188886 A1 | | 9/2005 | Vasel et al. | |
| 2018/0052247 A1 | | 2/2018 | Daniel et al. | |

FOREIGN PATENT DOCUMENTS

| | | |
|---|---|---|
| WO | 2016141222 A1 | 9/2016 |

OTHER PUBLICATIONS

International Search Report/Written Opinion dated Apr. 27, 2022 in related/corresponding PCT Application No. PCT/US2021/059665.

\* cited by examiner

*Primary Examiner* — Ian J Lobo

(74) *Attorney, Agent, or Firm* — PATENT PORTFOLIO BUILDERS PLLC

(57) ABSTRACT

An air gun for generating seismic waves in a marine environment includes a cylindrical body configured to hold compressed air and having plural air ports for releasing the compressed air from inside the cylindrical body, the cylindrical body extending along a longitudinal axis X, and an extension member attached externally to the body and extending along a radial axis R, which is perpendicular to the longitudinal axis X. The extension member promotes ambient water flowing inside an air bubble generated when the compressed air is released outside the body.

20 Claims, 12 Drawing Sheets

METHOD AND DEVICE FOR REDUCING BUCKING OF PNEUMATIC SEISMIC SOURCES

CROSS REFERENCE TO RELATED APPLICATIONS

This application claims priority and benefit from U.S. Provisional Patent Application No. 63/116,739, filed Nov. 20, 2020, for "A Method and an Apparatus for Reducing Bucking of Pneumatic Seismic Sources," the entire content of which is incorporated in its entirety herein by reference.

BACKGROUND

Technical Field

Embodiments of the subject matter disclosed herein generally relate to seismic surveillance and marine seismic sources associated with the surveillance, and, more specifically, to configuring a pneumatic marine seismic source to prevent bucking.

Discussion of the Background

The structure of underground formations is often explored using reflection seismology. In reflection seismology, a source or energy emits signals (which can be expressed as overlapping seismic waves) directed at the explored formation. Reflections of the signals arrive at different time intervals after the signal emissions at receivers. The reflections occur at interfaces between the explored formation's layers because signal propagation speed changes at these interfaces. The reflections carry information allowing estimation of depths of the interfaces and the nature of the layers. An image of the underground formation generated using this information may suggest the presence of subterranean hydrocarbon deposits. Reflection seismology is used on land and in marine environments.

A traditional marine survey system 100 for generating seismic signals and recording their reflections of a formation under the seafloor is illustrated in FIG. 1. A vessel 110 tows an array of seismic receivers 111 provided on streamers 112 (only two shown for simplicity, but more than two may be used). The streamers may be towed so that the receivers are at a substantially constant depth relative to a surface 114 of the water. However, the streamers may alternatively be towed so that receivers 111 on a same streamer 112 are at different depths from the surface 114.

Vessel 110 also tows a seismic source array 116 configured to generate seismic signals directed at the explored formation. The signals propagate along various trajectories 118 (only one labeled). Since the seismic signals are directed toward the explored formation, their energy propagates preferably downward, toward the seafloor 120. The seismic signals penetrate the seafloor 120 into the explored formation, and are being reflected, for example, at an interface 122. The reflected signals propagate upward, along trajectories such as 124, and are detected by the receivers 111 on the streamer 112. Analysis of the data (e.g., arrival time and amplitude of the reflected signals) collected by the receivers 111 may yield an image of the formation under the seafloor.

The seismic source array 116 traditionally includes a float 210, as shown in FIG. 2A, which is towed by the vessel 110. Plural air guns 212 (only two are shown in the figure for simplicity) are suspended from the float 210, through air gun bases 220 and cables or ropes 222 and 224. FIG. 2B shows an alternative source 116 that has the air gun 212 directly linked to the float 210, through plural ropes 222. For this embodiment, it is possible that each air gun is attached from a corresponding float. The air guns 212 have plural ports 214 through which compressed air 216 is released outside the gun, to generate the seismic waves. However, when the compressed air 216 fully encompasses a circumference of the gun 212, the pressure differences between (1) the air bubble 218 formed around the gun 212 and (2) the ambient water, results in a net force F, which is being applied upwards, mainly on the portion of the gun where the ports 214 are located. The result of this force F, when acting mainly on one end of the gun 212, is an acceleration of that party of the body of the gun, which translates into a rotational motion of the entire gun 212, relative to the end which is not affected by the air bubble 218, as shown in FIG. 2C. In other words, a torque is applied to the body of the gun 212. This motion of the air gun's body due to the compressed air bubble 218 interacting with the ambient water is called "bucking."

Bucking increases the risk for entanglement of the rigging (220, 222, and 224) that is holding the gun 212 attached to the float 210. Bucking may also cause additional wear and tear to the rigging 220, 222, and 224, to the electrical lines that extend between the vessel and the source array, to the telemetry lines, and to the air supply piping. Bucking also complicates the estimation of the far field signatures from near field hydrophones which are mounted on or near the rigging for this purpose. Bucking further reduces the efficiency of the source array because energy that would otherwise be radiated as useful acoustic waves is wasted on lifting the guns up.

Accordingly, it is desirable to develop methods and guns that are diminishing the bucking effect.

SUMMARY

According to an embodiment, there is an air gun for generating seismic waves in a marine environment. The air gun includes a cylindrical body configured to hold compressed air and having plural air ports for releasing the compressed air from inside the cylindrical body, the cylindrical body extending along a longitudinal axis X, and an extension member attached externally to the body and extending along a radial axis R, which is perpendicular to the longitudinal axis X. The extension member promotes ambient water flowing inside an air bubble generated when the compressed air is released outside the body.

According to another embodiment, there is a source array for generating seismic waves in a marine environment. The source array includes a float configured to float in water, and plural air guns suspended from the float and configured to generate the seismic waves. An air gun of the plural air guns includes a cylindrical body configured to hold compressed air and having plural air ports for releasing the compressed air from inside the cylindrical body, the cylindrical body extending along a longitudinal axis X, and an extension member attached externally to the body and extending along a radial axis R, which is perpendicular to the longitudinal axis X. The extension member promotes ambient water flowing inside an air bubble generated when the compressed air is released outside the body.

According to yet another embodiment, there is a method for reducing bucking associated with firing a marine air gun. The method includes providing a cylindrical body configured to hold compressed air and having plural air ports for releasing the compressed air from inside the cylindrical body, the cylindrical body extending along a longitudinal axis X, selecting an extension member with a given depth D, attaching the extension member external to the body, wherein the extension member extends along a radial axis R of the body, which is perpendicular to the longitudinal axis X, and promoting ambient water to flow, along the extension member inside an air bubble generated when the compressed air is released outside the body.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, relative to a marine seismic source including an air gun. However, similar methods and devices may be used for other marine sources and/or for sources having plural air guns.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 2A:
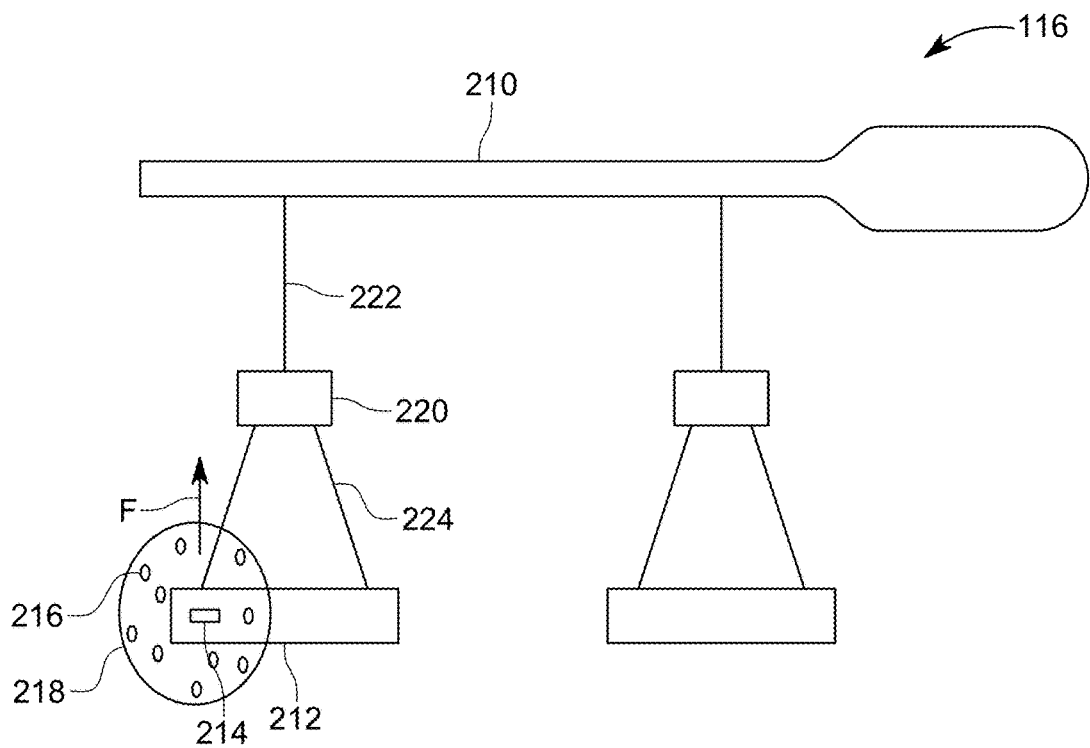
FIGS. 2A to 2C illustrate an air gun before being fired and after being fired and the bucking associated with the firing.
Figure 2B:
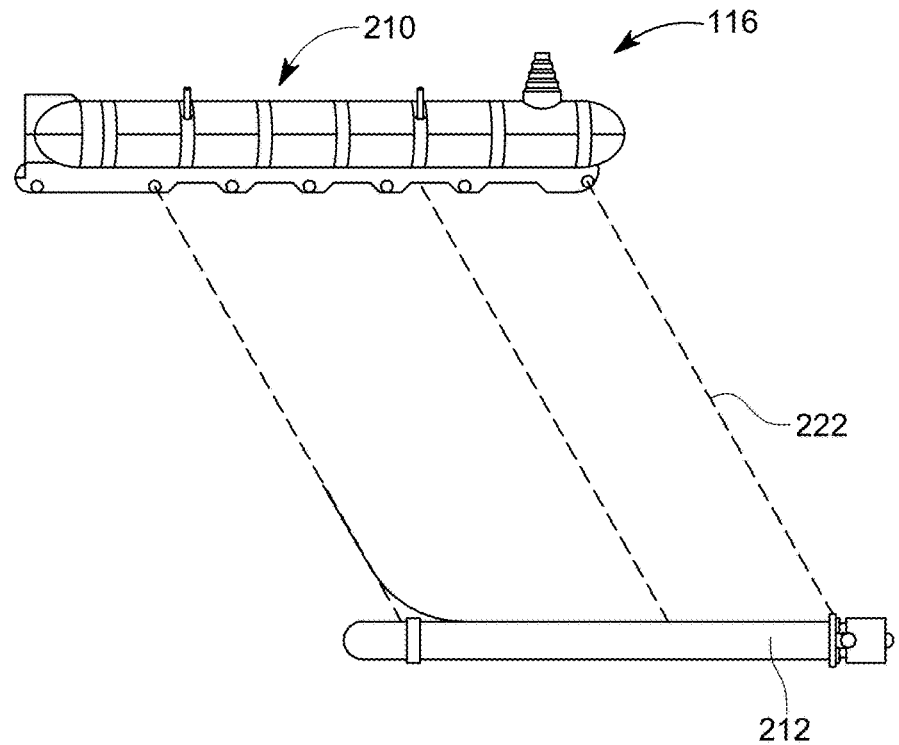
Figure 2C:
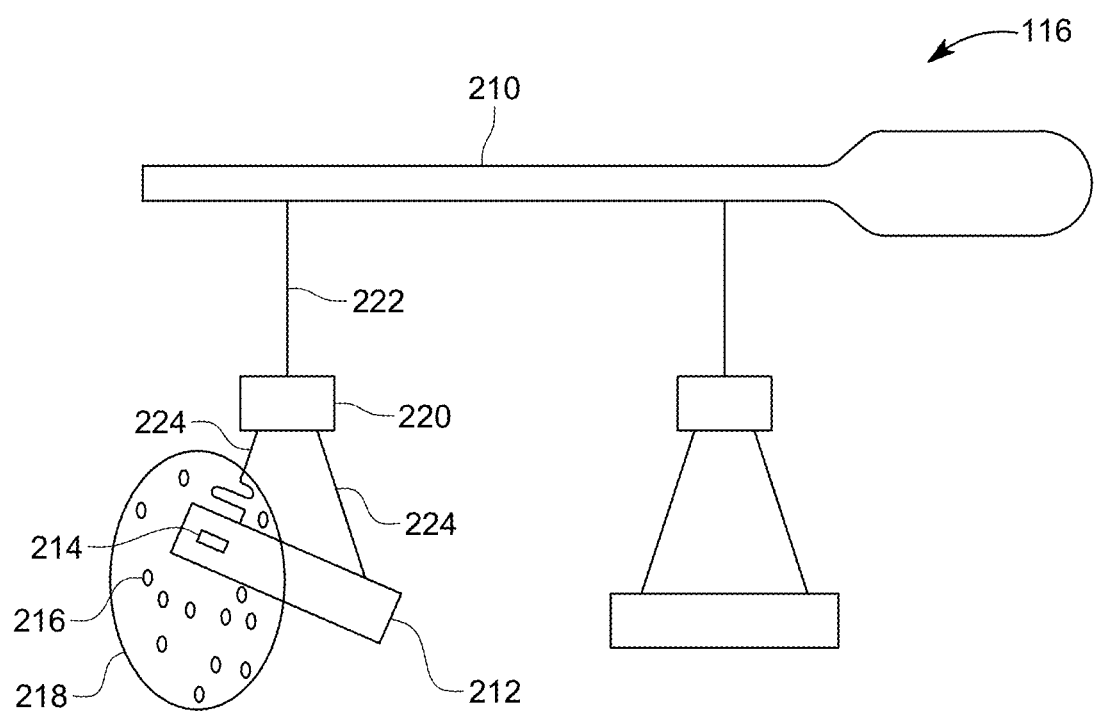

The bucking phenomena discussed above with regard to FIGS. 2A to 2C may cause the deformation or even the splitting of the bubble 218. The bubble 218 oscillates due to the imbalance between the released air pressure and the ambient fluid pressure. These oscillations are responsible for generating the seismic waves. The deformation or splitting of the air bubble 218 may result in a reduced low-frequency content of the seismic source because small bubbles that would results from the splitting of the large bubble 218 oscillate at a higher frequency than the large bubble 218. The low-frequency content for a marine seismic source is preferred to the high-frequency content for reasons of higher geophysical quality and lower environmental impact on the marine life. Therefore, splitting large bubbles into smaller bubbles is undesirable.

To prevent or at least reduce the bucking, in one embodiment, the air guns of the source array are configured to have one or more extensions (e.g., caudal fin; a fin is sized and shaped to be hydrodynamically efficient while an extension does not have to achieve the same efficiency) that project radially outward from the body of the air gun to reduce the acceleration of the source, which is the result of the force that the water at the edge of the air bubble applies to the seismic source as the air bubble is collapsing. In other words, according to Newton's second law of motion, the acceleration a is proportional to the force F and inversely proportional to the mass M, i.e., $$a = \frac{F}{M}.$$

In the past, the designers of the air guns have tried to reduce the bucking by increasing the mass M of the air gun, thus to reduce the acceleration. This is known in the art as ballasting the source. However, in one embodiment, the goal is to reduce the acceleration by reducing the force applied on the air gun, and not by increasing its mass. To be able to reduce the acceleration, as the force is constant (because the force is controlled by the pressure difference between the air bubble and the water pressure), it is possible to add an extension member to the body of the air gun with the goal of slicing through the water around the air bubble to allow the water to move toward the center of the air bubble. The extension member is sized and shaped to neither slow down the air gun while moving through water, nor introduce any vibration of the body or noise that might negatively interfere with the seismic waves generated by the air gun.

Figure 3:
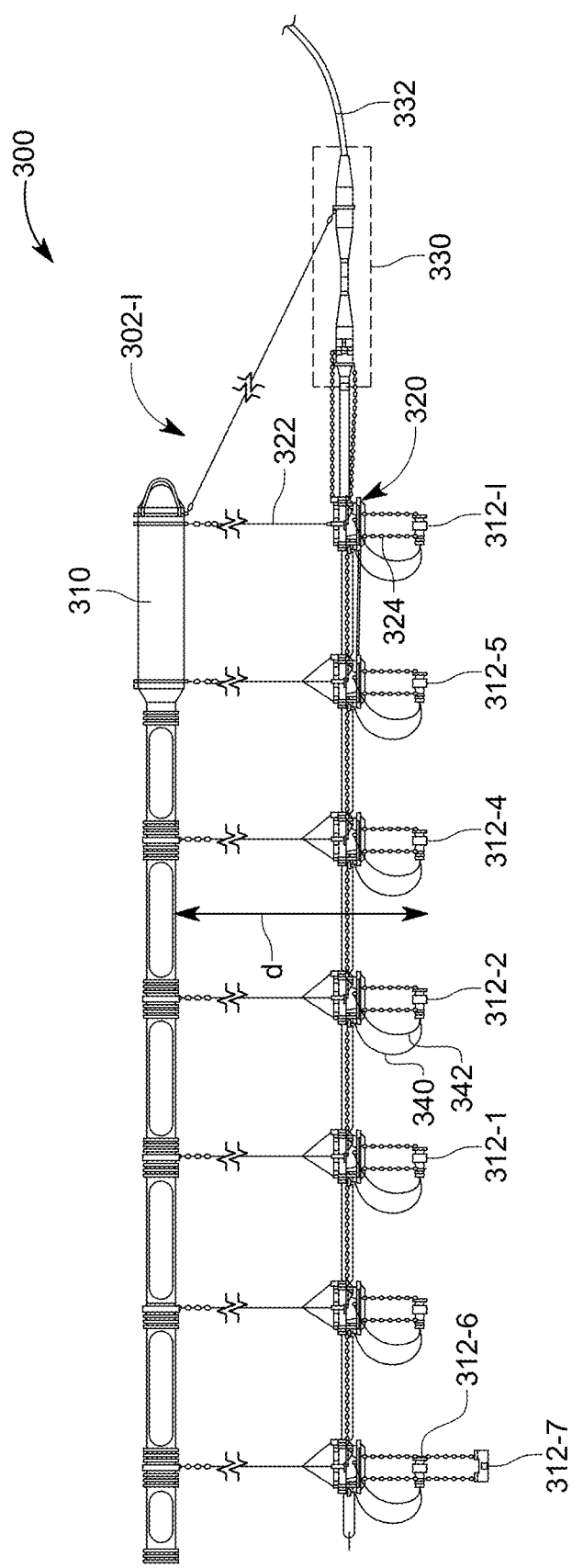
FIG. 3 illustrates a source array that is used with a marine seismic exploration system.

More specifically, as shown in FIG. 3, a source array 300 includes plural sub-arrays 302I, with I being a positive integer. Any number of sub-arrays may be used, but typically a source array includes three sub-arrays. Each sub-array 302I includes a float 310 from which plural air guns 312-I are attached. Each air gun 312-I is attached to the float 310 through a corresponding air gun base 320, and the air gun base 320 is attached to the float with a first rope 322 while the air gun 312-I is attached to the base 320 with one or more ropes or chains 324. A depth d of the air gun 312-I relative to the float 310 can be controlled. Plural conduits, e.g., electrical wires and compressed air hoses together with strength members enter a front end 330 of a support structure, e.g., a bell house. The front end 330 may also include a bend restrictor to which the float is attached. The front end 330 is connected to an umbilical 332, which is attached to the towing vessel (seen in FIG. 1). The compressed air and the electrical signals are distributed individually to each air gun 312-I, through corresponding compressed air link 340, and an electrical link 342. The electrical link 342 is also used for exchanging data and/or commands with a controller of the vessel. Two or more air guns 312-6 and 312-7 may be attached at the same position along the float 310.

Figure 4A:
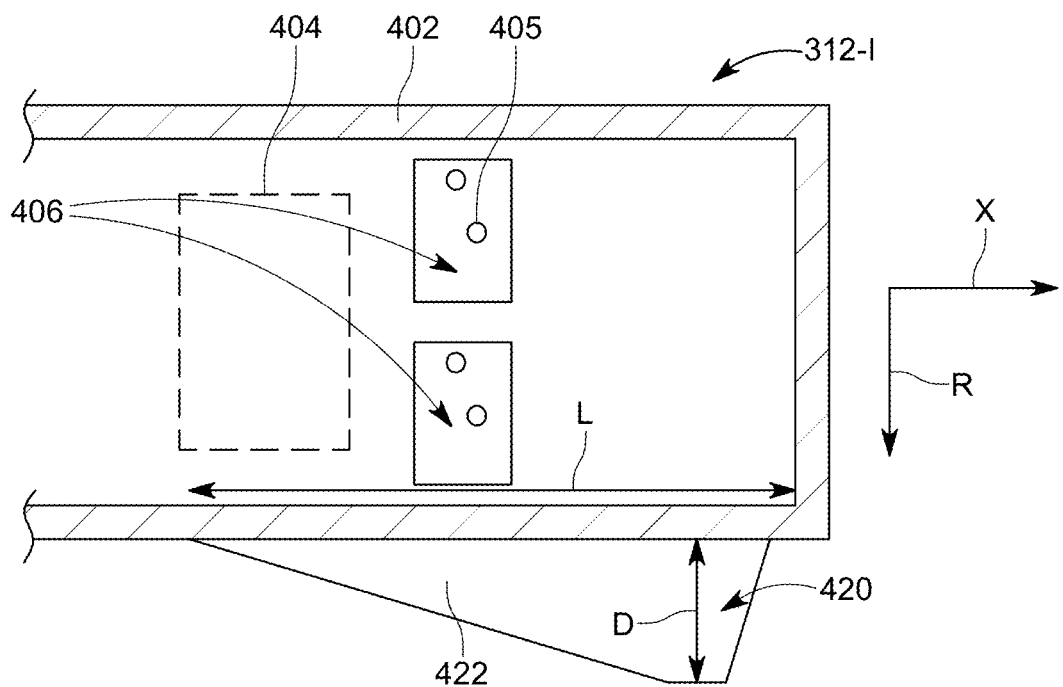
FIG. 4A shows a side view of an air gun having an extension member.
Figure 4B:
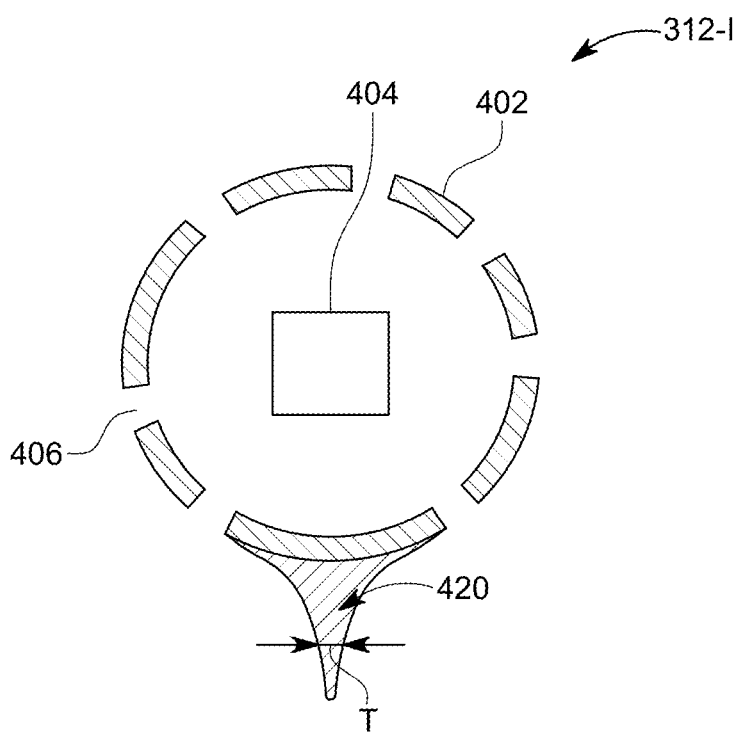
FIG. 4B shows a front view of the air gun.

A side view of a single air gun 312-I is shown in FIG. 4A and a front view of the same air gun 312-I is shown in FIG. 4B. The air gun 312-I has a body 402 made of a strong material, for example, steel. The body 402 may be shaped as a cylinder or may be a cylinder. The body 402 holds inside a pneumatic mechanism 404 that is configured to receive the compressed air from the vessel, along the pneumatic conduit in the umbilical 332. The pneumatic mechanism 404 may have a movable piston (not shown) that is configured to release the compressed air, when instructed by an electrical signal transmitted along the electrical conduit in the umbilical 332, so that the compressed air 405 is released outside the body 402, through plural ports 406. More details about a possible pneumatic mechanism may be found in U.S. Pat. No. 9,507,038, assigned to the assignee of the present application, the content of which in incorporated herein by reference. The ports 406 may be formed symmetrically around the circumference of the body 402. In one application, the extension member contacts the circumference of the body where the ports are distributed.

A single extension member 420 is used in this embodiment, as shown in FIGS. 4A and 4B. The extension member 420 is attached outside, to the body 402, to extend radially away from the body. In this embodiment, the extension member 420 is a caudal fin and is located toward the aft of the body 402, next to the ports 406. In this embodiment, the extension member 420 extends along a longitudinal axis X of the body 402 for a certain length L, and also extends along a radial direction R for a depth D. In one application, D is smaller than L. In another application, a part 422 of the extension member 420 is aligned, along the longitudinal axis X, with a position of the ports 406. In this or another application, the extension member 420 is constructed to have a trapezoidal shape. The depth D may be between 1 and 30 cm, with a preferred value about 10 cm. The length L may be about 50 cm or smaller. However, any sizes may be used for the depth D and length L as long as the bucking is reduced or eliminated. A largest thickness T of the extension member 420 is selected to be very small, e.g., smaller than 5 cm, or smaller than 2 cm, or even smaller than 1 cm, so that minimum disturbance is generated by the advancement of the extension member 420 in water.

Figure 4C:
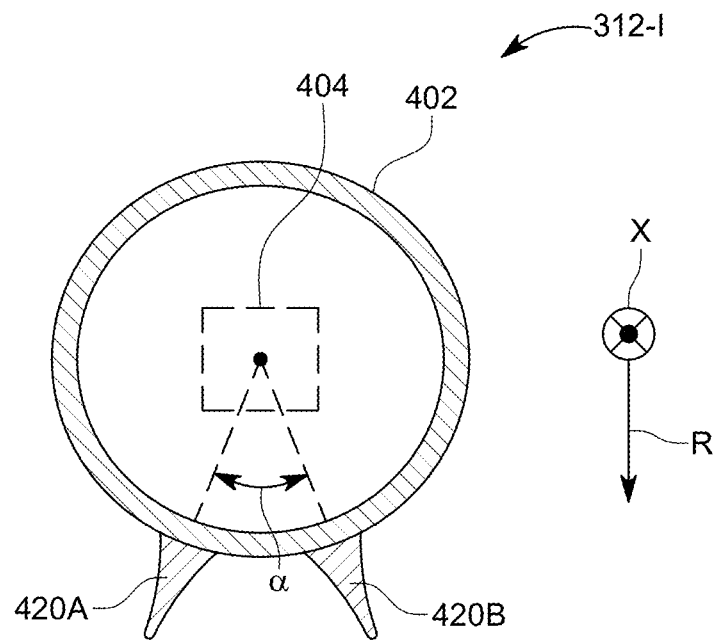
FIG. 4C shows the air gun having two extension members.
Figure 4D:
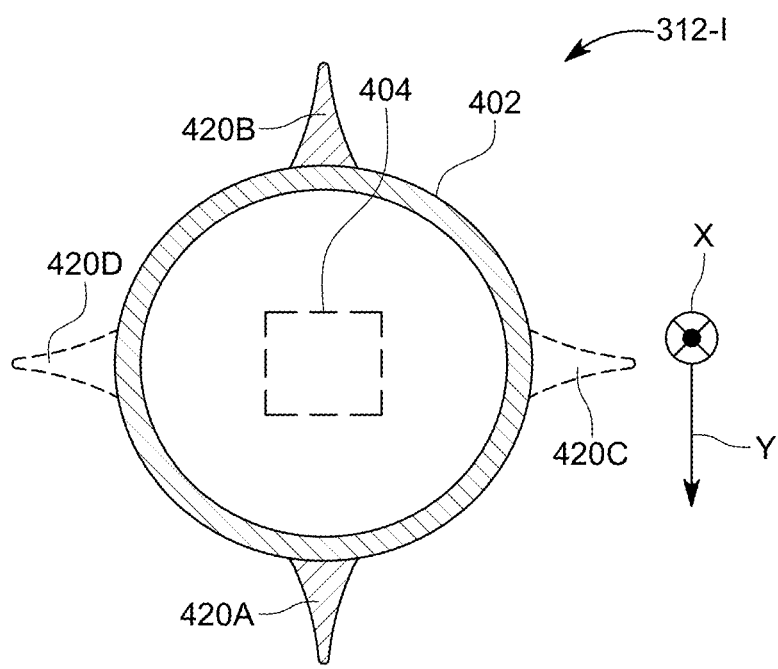
FIG. 4D shows an air gun having up to four extension members.

The extension member may be made unitary with the body 402 or the gun or may be attached by various means, for example, bolts, welding, etc. The extension member may be made of the same material as the body of the gun or a different material (e.g., stainless steel, bronze, copper, or a composite material). In one embodiment, more than one extension members may be attached to the body of the air gun, as shown in FIG. 4C. The two extension members 420A and 420B are located at the bottom of the body 402 (when using the radial axis R as a reference, as the radial axis R points in the same direction as the gravity in this embodiment; note that the X axis enters into the page in this figure). The two extension members 420A and 420B are separated by an angle α, which is smaller than 45 degrees, i.e., there is an angular separation between the two members relative to a central axis of the body. The two extension members may be made to have the same or different shapes. In yet another embodiment, as illustrated in FIG. 4D, one extension member 420A points in the direction of the gravity (axis Y in the figure, axis X enters into the page) while the other extension member 420B points opposite the gravity, i.e., the two extension members are attached to diametrically opposite locations of the body 402. In yet another embodiment, it is possible to add more extension members 420C and 420D, that point opposite to each other, in a plane parallel to the water surface, as also shown in FIG. 4D with the dash lines. Any number of extension members may be used as long as these extension members do not change a trajectory of the gun 312-I while moving in water when towed by the vessel.

Figure 5:
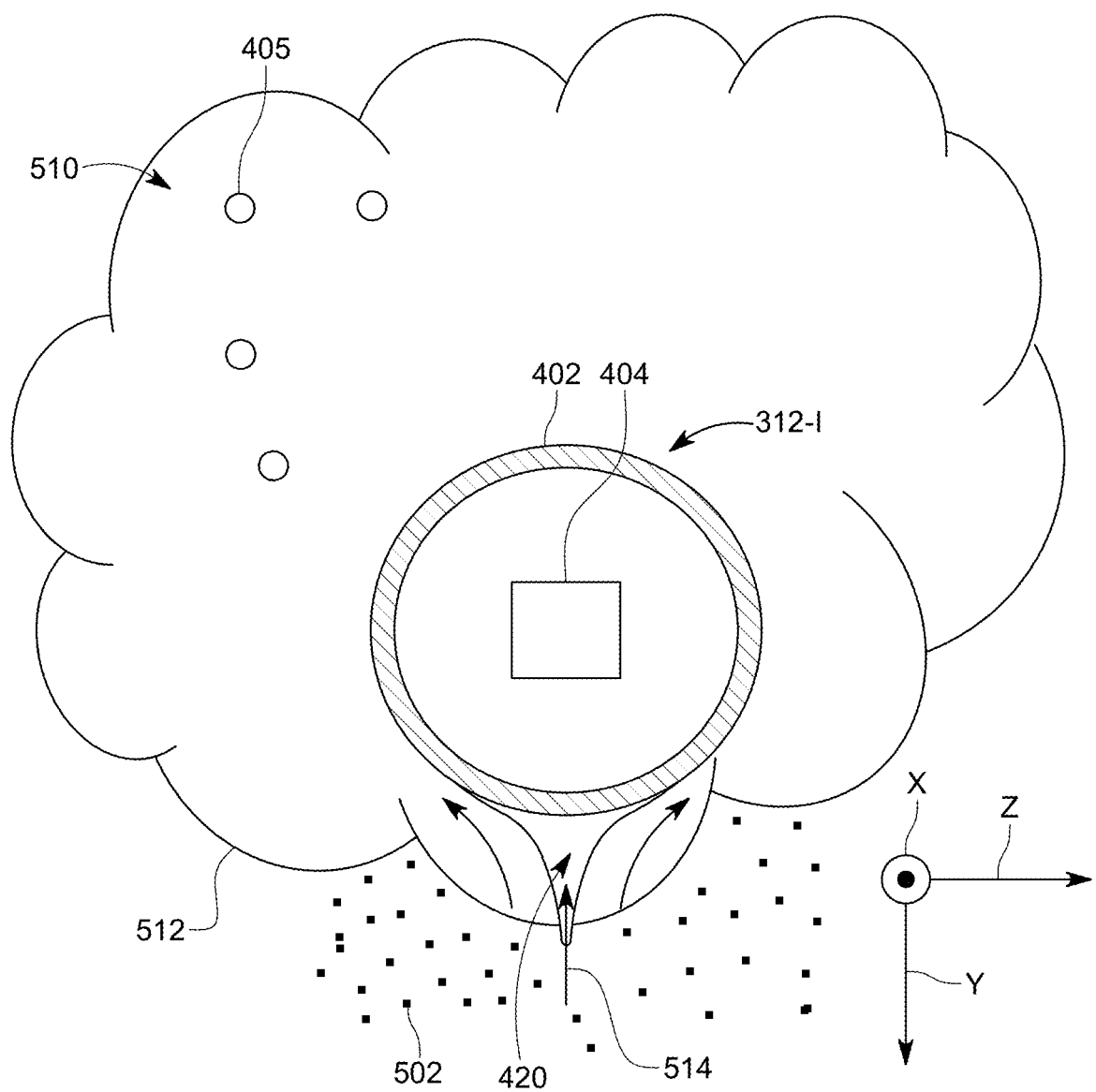
FIG. 5 is a front view showing how the extension member promotes a water flow entering the air bubble to reduce bucking.
Figure 6:
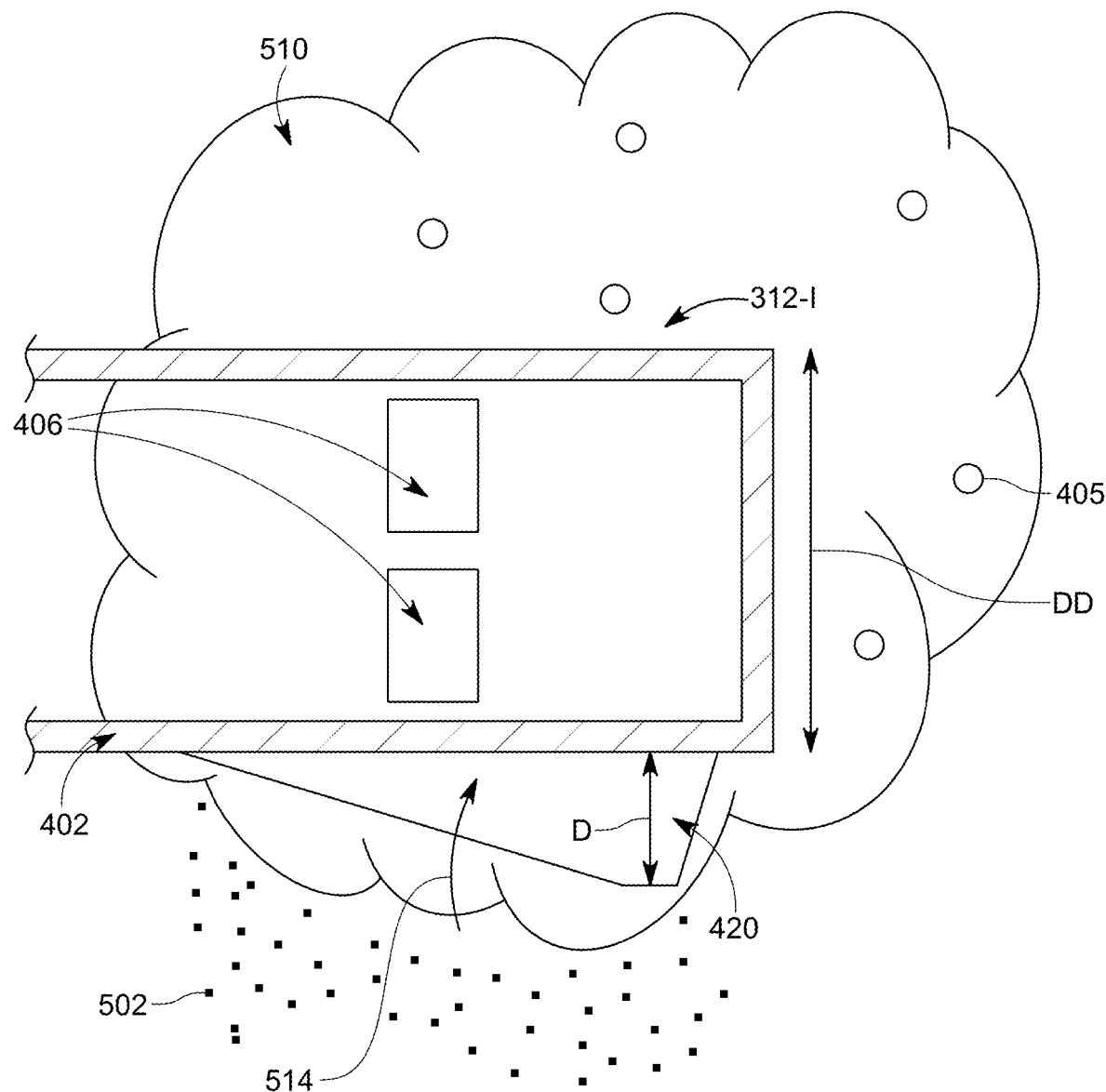
FIG. 6 is a side view of the same effect.

The location and the shape of the extension member 420 are selected such that the water 502 at the edge/interface 512 of the collapsing bubble 510 is deflected around the extension member 420, as indicated by the water flow 514 in FIG. 5. The extension member 420 is shown in FIG. 5 slicing through the water 502 as the water moves in the direction of the center of the collapsing bubble 510. The extension member 420 allows the air gun 312-I to slice through the water 502 and essentially to form a passage for the water to enter the bubble 510. The mass of the extension member 420 increases the overall mass of the air gun 312-I and this reduces the acceleration a discussed above. However, more advantageously, the shape and the location of the extension member 420 reduces the force F that the water applies to the body 402, which further reduces the acceleration a. The reduced acceleration reduces the bucking. Note that the ports 406 are omitted for simplicity in this and in a couple of the preceding figures. FIG. 6 illustrates a side view of the same configuration achieving the slicing through the air bubble, and the entrance of the water flow 514 next to and along the extension member 420.

Figure 1:
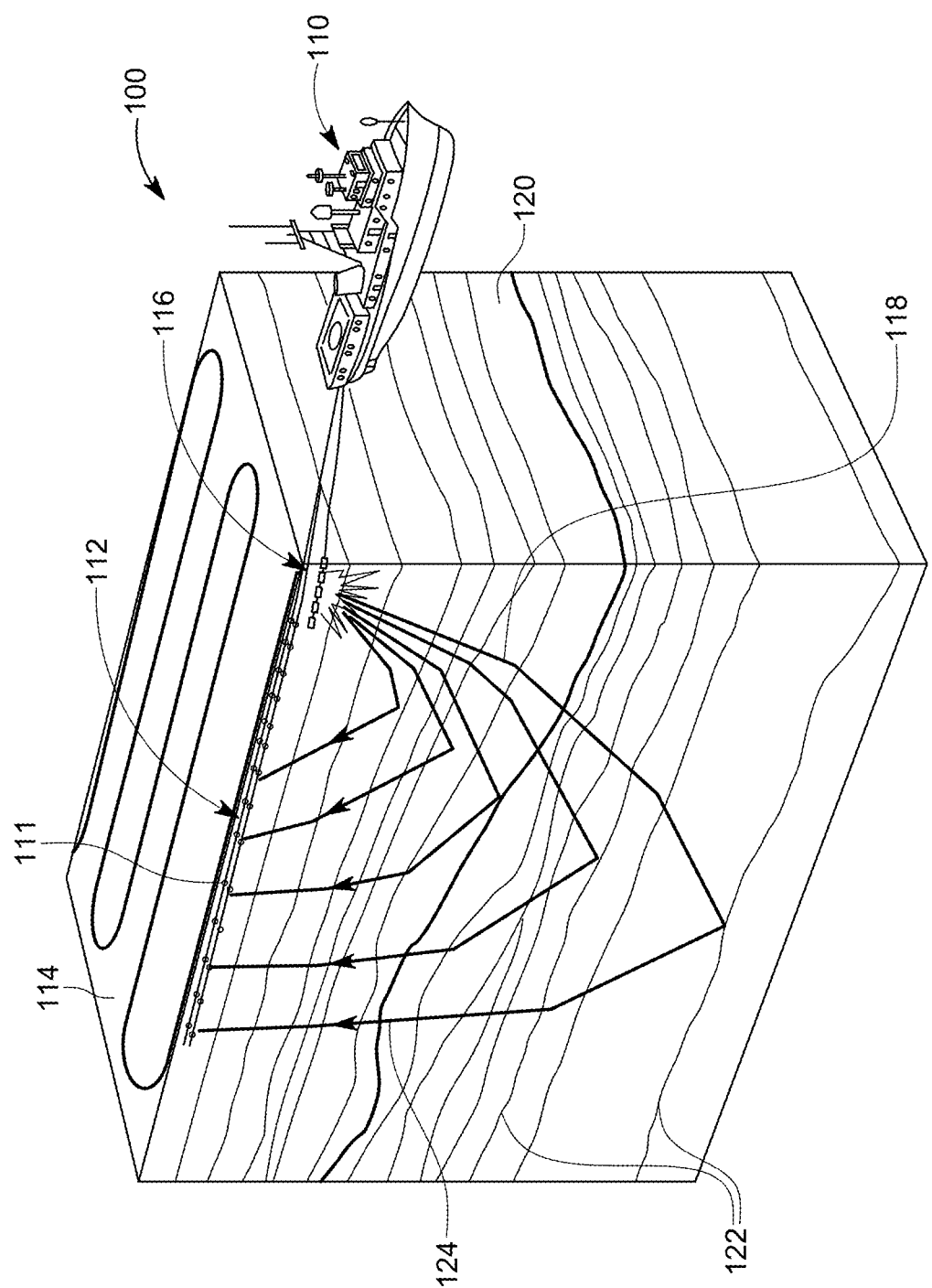
FIG. 1 illustrates a traditional marine survey system.

It is noted that initially, when the air bubble is generated, it has a pressure larger than the pressure of the water at the ports 402. However, as the time passes, the bubble starts to oscillate, with a decreasing amplitude. As the bubble collapses and the air-water interface 512 moves closer to the body 402, when the air-water interface 512 passes the tip part of the extension member 420, the water 502 is able to enter inside the air bubble 510, and thus reduces the force that is applied on the body 402 of the air gun 312-I, achieving the goal of reducing the bucking. In one application the original bucking is about 3 m and the reduced bucking, when the extension member 420 is present, is about 1 m. Thus, by adjusting the depth D of the extension member 420, it is possible to control how quickly, after firing the gun, the air-water interface 512 reaches the tip of the extension member 420, which results in controlling at what instant the force applied by the water is reduced. In other words, the larger the depth D of the extension member 420, the quicker the force applied by the water to the body 402 is reduced. In one application, the depth D of the extension member D is selected based on a diameter DD of the body 402, and the towing depth d of the air gun 312-I relative to the float 310, as shown in FIG. 1. In one application, the diameter DD is about 30 cm and the towing depth is about 3 to 7 m.

While FIGS. 4A to 6 show a single air gun having one or more extension members, one skilled in the art would understand that one or more of the air guns shown in FIG. 3 as being part of the source array 300 may be configured to have the extension member. In one application, all the air guns of the source array are configured to have the extension member. The air guns may have the same size extension members or, extension members having different sizes. The extension member may be a fin and a cross-section of the fin, in the plane YZ as illustrated in FIG. 5 (the X axis is exiting the paper), may be triangular.

Figure 7A:
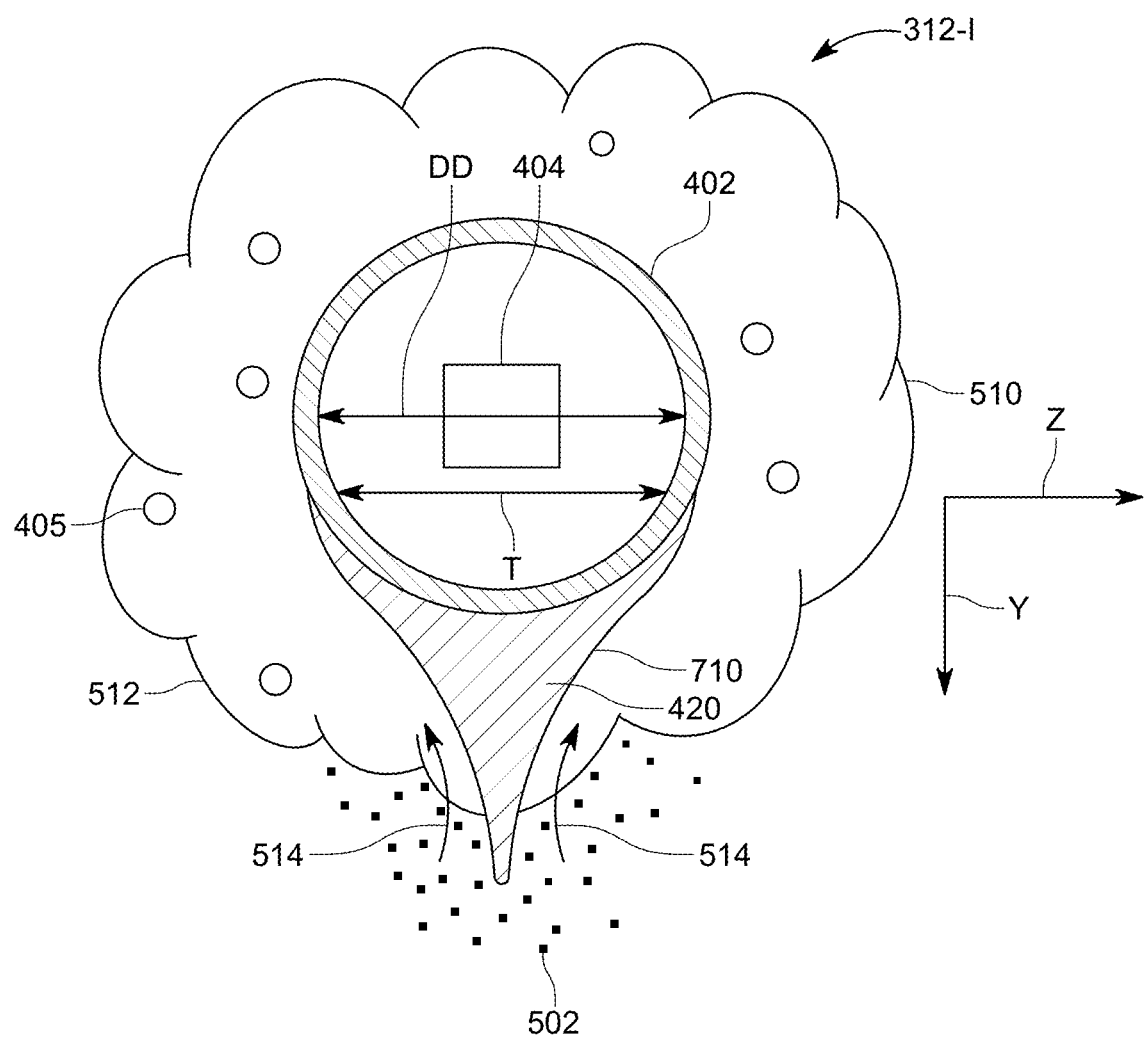
FIG. 7A is a front view and FIG. 7B is a side view of an air gun having an extension member with a large thickness.
Figure 7B:
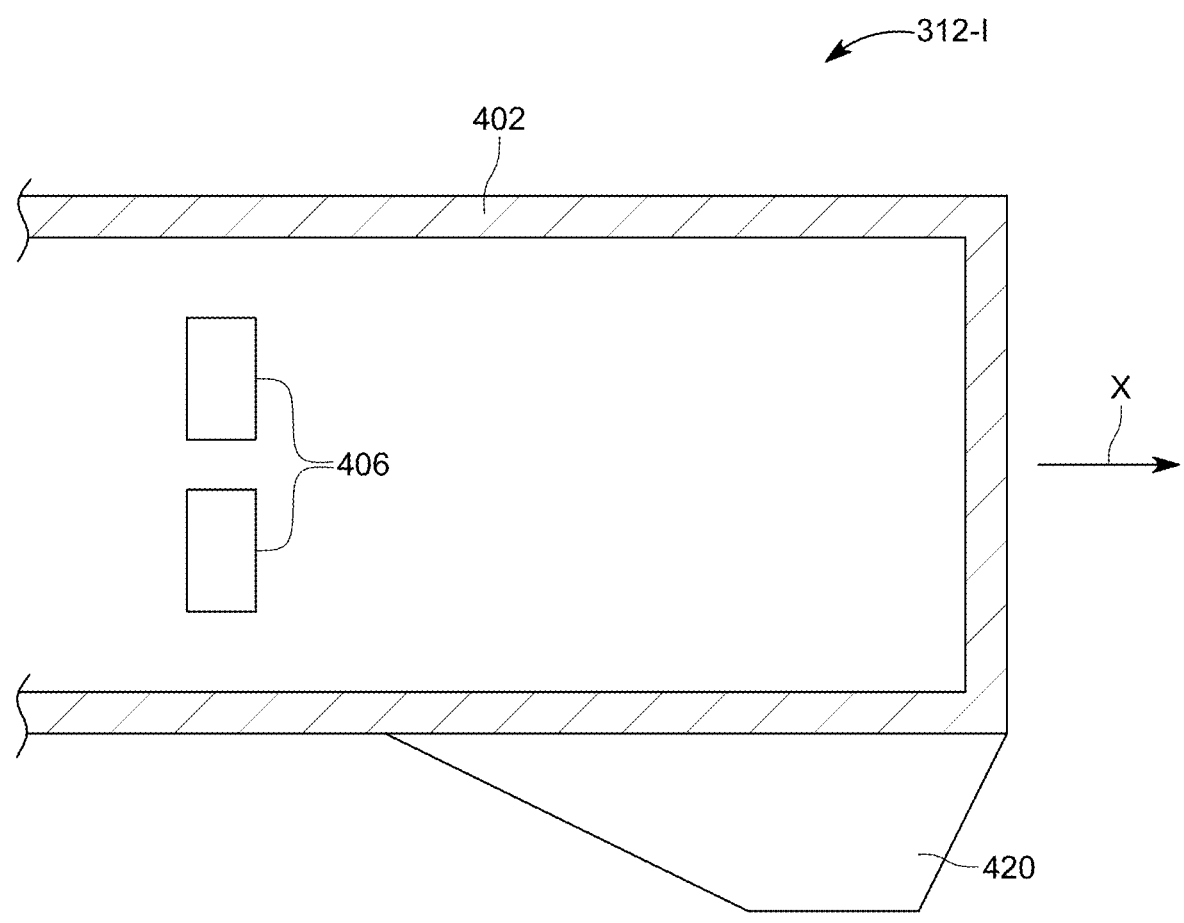
Figure 7C:
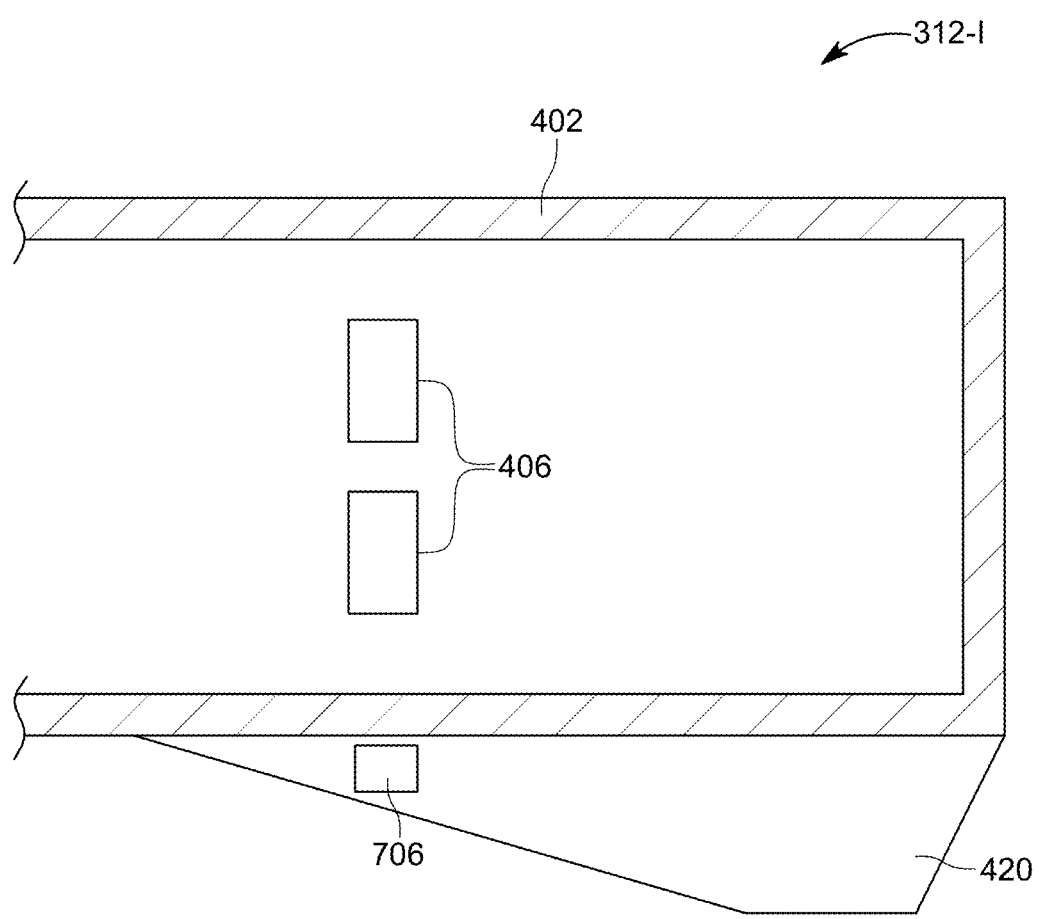
FIG. 7C is another side view of another air gun having the extension member with the large thickness.

In yet another embodiment, as illustrated in FIG. 7A, the extension member may have a largest thickness T so large that is it comparable to the diameter DD of the body 402 of the air gun 312-I. In one application, the thickness T is larger than DD/2 but smaller than DD. In another application, the thickness T is larger than ⅔ of DD but smaller than DD. In yet another application, T is substantially equal to DD, where the term "substantially" is understood herein to mean "within 10%." For this embodiment, even if the depth D of the extension member is small, there is no substantial force applied by the water on the body 402 as the surface 710 extending from the tip of the extension member 420 to the body 402 is masking the entire body 402, and also is deflecting the force in opposite directions along the axis Z. For this embodiment, it is possible that the extension member 420 either starts, along the X axis, behind the air ports 406, so that the extension member does not interfere with the creation of the air bubble 510, as shown in FIG. 7B, or the extension member 420 has its own holes 706, that correspond to the bottom ports 406 of the body 402, which bottom ports 406 are otherwise covered by the large thickness extension member 420. The configuration shown in FIG. 7B may also be applied to the air gun shown in FIGS. 4A to 4C.

Figure 8:
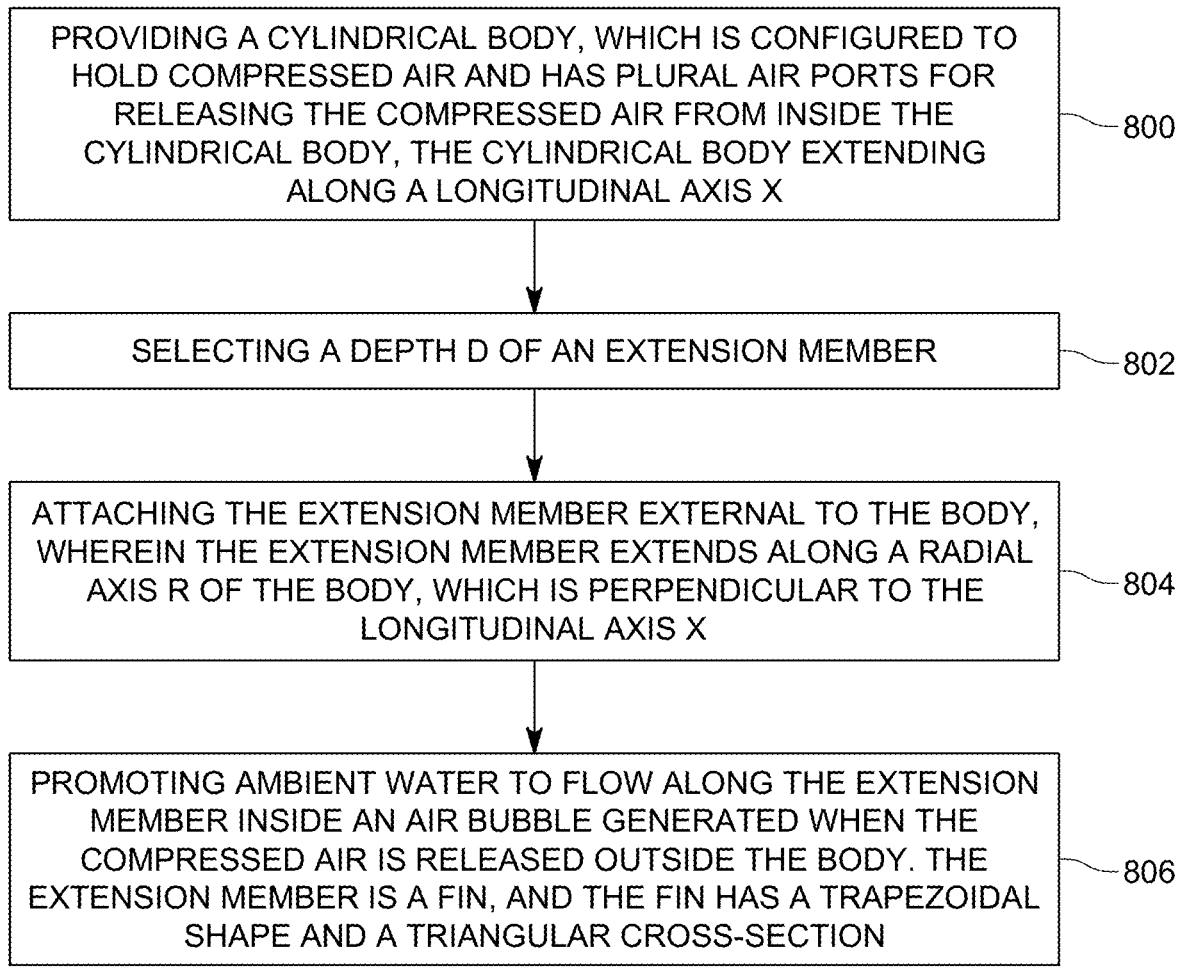
FIG. 8 is a flow chart of a method for preparing an air gun to have the extension member to promote the water flow into the air bubble when the air gun is fired.

A method for reducing bucking associated with firing a marine air gun is now discussed with regard to FIG. 8. The method includes a step 800 of providing a cylindrical body, which is configured to hold compressed air and has plural air ports for releasing the compressed air from inside the cylindrical body, the cylindrical body extending along a longitudinal axis X, a step 802 of selecting a depth D of an extension member, a step 804 of attaching the extension member external to the body, wherein the extension member extends along a radial axis R of the body, which is perpendicular to the longitudinal axis X, and a step 806 of promoting ambient water to flow along the extension member inside an air bubble generated when the compressed air is released outside the body. The extension member is a fin, and the fin has a trapezoidal shape and a triangular cross-section.

The disclosed embodiments provide marine sources, methods and systems for reducing a force exerted by the ambient water on the air guns when the air guns are fired. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. An air gun for generating seismic waves in a marine environment, the air gun comprising:
    a cylindrical body configured to hold compressed air and having plural air ports for releasing the compressed air from inside the cylindrical body, the cylindrical body extending along a longitudinal axis X; and
    an extension member attached externally to the body and extending along a radial axis R, which is perpendicular to the longitudinal axis X,
    wherein a depth of the extension member is selected based on a diameter of the body and a towing depth of the air gun so that the extension member promotes ambient water flowing inside an air bubble generated when the compressed air is released outside the body, to reduce bucking.

2. The air gun of claim 1, wherein the extension member is a fin.

3. The air gun of claim 2, wherein the fin has a trapezoidal shape and a triangular cross-section.

4. The air gun of claim 2, wherein the fin is attached to an aft of the body.

5. The air gun of claim 1, wherein the extension member includes two fins, oppositely distributed around the body.

6. The air gun of claim 1, wherein the extension member includes two fins, each located at a bottom of the body with a given non-zero angular separation from each other.

7. The air gun of claim 1, wherein the body receives compressed air from a towing vessel, and the body is attached to a float.

8. The air gun of claim 2, wherein the air ports are located around a circumference of the body and the fin contacts the circumference.

9. The air gun of claim 2, wherein a largest thickness of the fin is larger than half of a diameter of the body and smaller than the diameter of the body.

10. The air gun of claim 2, wherein a largest thickness of the fin is larger than two thirds of a diameter of the body and smaller than the diameter of the body.

11. A source array for generating seismic waves in a marine environment, the source array comprising:
    a float configured to float in water; and
    plural air guns suspended from the float and configured to generate the seismic waves,
    wherein an air gun of the plural air guns includes,
    a cylindrical body configured to hold compressed air and having plural air ports for releasing the compressed air from inside the cylindrical body, the cylindrical body extending along a longitudinal axis X; and
    an extension member attached externally to the body and extending along a radial axis R, which is perpendicular to the longitudinal axis X,
    wherein a depth of the extension member is selected based on a diameter of the body and a towing depth of the air gun so that the extension member promotes ambient water flowing inside an air bubble generated when the compressed air is released outside the body, to reduce bucking.

12. The source array of claim 11, wherein the extension member is a fin.

13. The source array of claim 12, wherein the fin has a trapezoidal shape and a triangular cross-section.

14. The source array of claim 12, wherein the fin is attached to an aft of the body.

15. The source array of claim 11, wherein the body receives compressed air from a towing vessel, the body is attached to the float and each air gun of the source array has the same structure.

16. The source array of claim 12, wherein the air ports are located around a circumference of the body and the fin contacts the circumference.

17. The source array of claim 12, wherein a largest thickness of the fin is larger than half of a diameter of the body and smaller than the diameter of the body.

18. The source array of claim 12, wherein a largest thickness of the fin is larger than two thirds of a diameter of the body and smaller than the diameter of the body.

19. A method for reducing bucking associated with firing a marine air gun, the method comprising:
provingding a cylindrical body configured to hold compressed air and having plural air ports for releasing the compressed air from inside the cylindrical body, the cylindrical body extending along a longitudinal axis X;
selecting an extension member with a given depth D, wherein the depth of the extension member is selected based on a diameter of the body and a towing depth of the air gun;
attaching the extension member external to the body, wherein the extension member extends along a radial axis R of the body, which is perpendicular to the longitudinal axis X; and
promoting ambient water to flow, along the extension member inside an air bubble generated when the compressed air is released outside the body, to reduce bucking.

20. The method of claim 19, wherein the extension member is a fin, and the fin has a trapezoidal shape and a triangular cross-section.

* * * * *